United States Patent

Mackal et al.

[11] 3,754,731
[45] Aug. 28, 1973

[54] INFLATION MANIFOLD VALVE AND FLANGE ASSEMBLY

[75] Inventors: Glenn H. Mackal, Saddle River; George E. Lardner, Hawthorne, both of N.J.

[73] Assignee: Halkey-Roberts Corporation, Paramus, N.J.

[22] Filed: Jan. 18, 1972

[21] Appl. No.: 218,669

[52] U.S. Cl. ............... 251/145, 285/216, 285/222, 285/258, 137/223, 9/11 R, 29/512
[51] Int. Cl. ............... F16l 5/02, B21d 39/18
[58] Field of Search ............... 29/512, 513; 285/216, 222, 256, 257, 258, 158; 251/145; 137/223, 224, 224.5, 225-234, 234.5; 9/11, 12, 13, 314-327

[56] References Cited
UNITED STATES PATENTS

| | | | |
|---|---|---|---|
| 2,275,820 | 3/1942 | Hosking | 137/224 X |
| 2,378,924 | 6/1945 | Honegger et al. | 9/319 X |
| 2,949,129 | 8/1960 | Roehrig | 251/144 X |
| 3,319,324 | 5/1967 | Keller | 29/513 X |
| 2,958,101 | 11/1960 | Guggenheim et al. | 29/512 |
| 2,087,969 | 7/1937 | Gookin | 29/512 |
| 3,142,850 | 8/1964 | De Boer | 9/11 R |

*Primary Examiner*—William R. Cline
*Attorney*—Alfred Vibber

[57] ABSTRACT

An assembly of valve body and mounting flange connected and sealed together by a novel crimped joint which strongly resists turning of the valve body relative to the flange. The valve body, for example, may be adapted for mounting in an inflation manifold, and the flange may be adapted for being sealed to the wall of an inflatable article at an opening through such wall. The invention includes a novel method of and an apparatus for forming the crimped joint.

9 Claims, 9 Drawing Figures

Patented Aug. 28, 1973
3,754,731
2 Sheets-Sheet 1
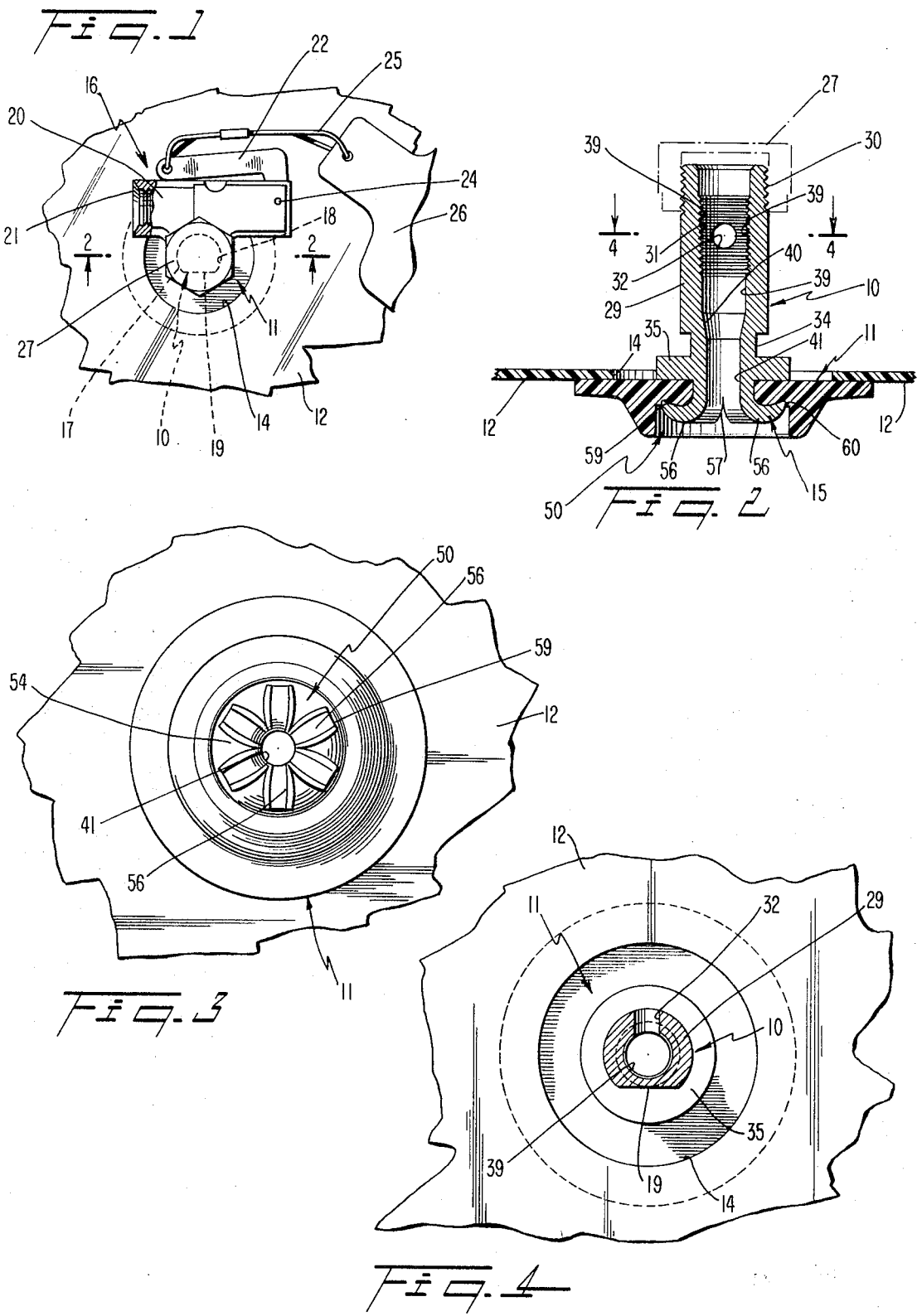

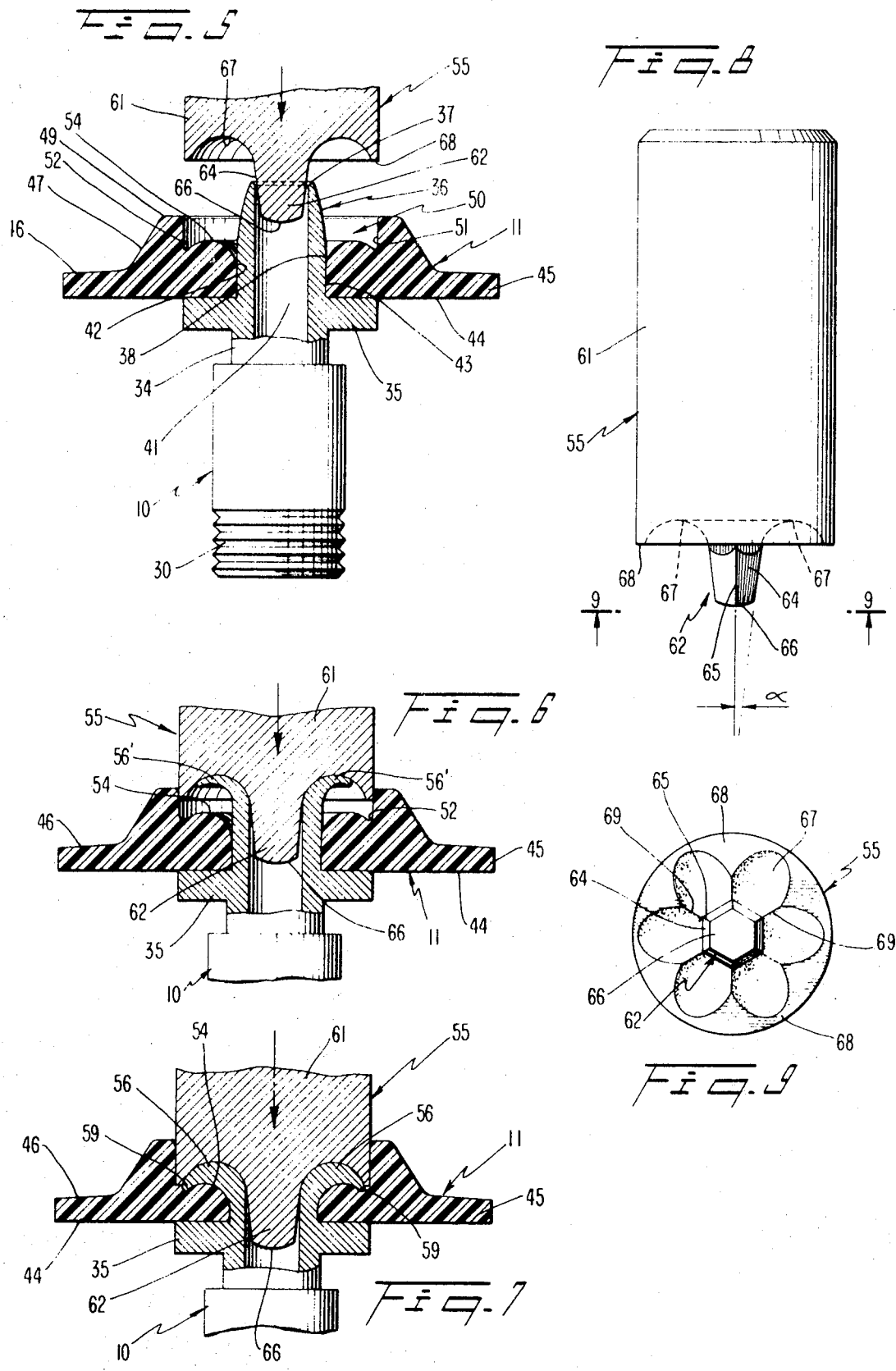

INFLATION MANIFOLD VALVE AND FLANGE ASSEMBLY

This invention relates to an assembly of valve body and mounting flange connected and sealed thereto by a crimped joint which strongly resists turning of the valve body relative to the flange.

The invention also relates to a method of and an apparatus for forming the crimped joint.

Although not limited thereto, the invention is illustrated herein in connection with the use of the assembly in a $CO_2$ inflation manifold for use with an inflatable article such as a life vest, life raft, and the like. In such use the connection between valve body and the mounting flange must sustain the torque of pulling a lanyard to open a $CO_2$ cartridge. Prior constructions of the same general type have included an assembly of valve body and rubber or rubber-like mounting or base wherein the flange is molded about, cured and bonded to a multi-perforated flange integral with the valve body. The mounting flange was then cemented to the side wall of an inflatable article at a hole therein. Such construction is shown for example, in Military Specification MIL–I–23145A(AS), which may employ an inflator valve stem No. 52A6598. This construction has been in use since the time of World War II; it is quite satisfactory for rubberized fabric, but it requires expensive molding equipment for forming the mounting flange upon the valve body, and oven or kiln equipment for curing the molded elastomeric flange.

A more recently developed assembly of this type is that shown in Moran U.S. Pat. No. 3,512,807. In such assembly, a plastic flange or base, adapted for being heat sealed to the wall of an inflatable article, has a central passage therethrough of a non-circular shape, the valve body having a complementary shape for interfitting therewith so that valve and mounting flange are locked against relative rotation. The combination of valve body and mounting flange are held together and sealed to each other by being compressed between a flanged head on one end of the valve body and the sleeve position of an inflation manifold in which the valve body is mounted and a cap nut on the other end of the valve body.

The latter above-described prior art construction contains many parts and, therefore, is costly and time-consuming to assemble, and they introduce many possibilites for valve leakage and failures. Further, the torque-sustaining capacity of the connection between the valve body and mounting flange or base is restricted, because of its limited diameter and the fact that the interengaging relatively non-rotatable parts forming such connection are not actually greatly out-of-round.

The assembly of the present invention is particularly characterized by its high torque-resisting capacity, as well as the ease with which the connection between the valve body and the mounting flange is made. The assembly can be pre-tested, if desired; the cap nut merely secures the valve body of the assembly in the manifold and seals it thereto, rather than also being relied upon to seal the valve body to the mounting flange.

The invention also includes the provision of a method of and an apparatus for forming the above-described connection between the valve body and the mounting flange of the assembly.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views:

FIG. 1 is a view in end elevation of the valve of the invention mounted in an inflation manifold, the crimp mounting flange to which the valve is sealed being itself sealed to a fragmentarily shown side wall of an inflatable article at an opening therethrough;

FIG. 2 is a view in axial section through the outer portion or body of the valve per se, the section being taken along the line 2—2 of FIG. 1;

FIG. 3 is a view in bottom plan of the assembly of valve, crimp flange, and inflatable article, a fragment of the side wall of the inflatable article being shown;

FIG. 4 is a view in transverse section through the valve body, the section being taken along the line 4—4 of FIG. 2;

FIG. 5 is a fragmentary view partially in side elevation and partially in axial section of an assembly of crimp flange and valve body, the inner or rear end of the valve body being about to be split and clinched by a descending male die;

FIG. 6 is a view similar to FIG. 5 but with the male die having advanced into generally the midpoint of its downward stroke;

FIG. 7 is a view similar to FIGS. 5 and 6 but with the male die having advanced into its lower terminal position;

FIG. 8 is a view in side elevaton of the male valve-clinching die; and

FIG. 9 is a view in bottom plan of such die, the view being taken from the line 9—9 of FIG. 8.

Turning first to FIG. 2, there is there shown in axial section the tube-like body 10 of the valve. Body 10 is securely mechanically connected and sealed to a heat-sealable plastic crimp flange 11, which in turn is heat-sealed to the side wall or panel 12 of an inflatable article at a hole 14 therethrough. In the embodiment shown, the crimp flange is disposed below or inwardly of the side wall 12. In the illustrative embodiment the body 10 is made of a suitable metal such as brass. The crimp flange is of a suitable heat sealable elastomeric plastic material such as polyurethane. The crimp joint, which will be described in detail hereinafter, is generally designated by the reference character 15. Although not limited thereto, the assembled valve and crimp flange are described herein and are shown in FIG. 1 as being parts of a $CO_2$ inflation manifold, generally designated 16, for the inflatable article, which may be a life vest, life raft, or the like.

The manifold 16 has a sleeve 17 having a passage 18 therethrough disposed normal to the plane of the paper of FIG. 1, passage 18 being of D-shaped cross-section with a flat surface 19 which in FIG. 1 is disposed at the lower side of the passage. The valve body 10 in the upper or outer portion thereof has a D-shaped cross-section of such size and configuration as accurately to fit within the passage 18 in the sleeve 17 of the manifold 16. The valve 10 is held in position in the sleeve 17 and sealed thereto by means to be described.

The manifold 16 has a further, transverse portion 20 which constitutes a chamber, portion 20 having an internally threaded end 21 adapted to receive a $CO_2$ cartridge (not shown). The sealing means on the neck of the cartridge, usually in the form of a soft metal such as solder, may be pierced by a hollow needle (not shown) which is advanced toward the cartridge upon the turning of a needle-advancing means, which is here shown at 22 in the form of a bell crank, clockwise about its pivot mounting pin 24 on the portion 20 of the manifold. In use, the bell crank 22 is pulled by grasping and pulling a handle 26 which is attached to a lanyard 25 which in turn is attached to the outer end of the arm of the bell crank shown as lying horizontal in FIG. 1.

Such pulling of the lanyard so as to open the $CO_2$ cartridge and inflate the life vest or life raft frequently must take place in stormy seas and under conditions which require the cartridge to be opened quickly. The pulling of the handle 26 and the swinging of the bell crank 22 subject the manifold 16 to a clockwise torque, (FIG. 1), such torque being effectively opposed by the side wall 12 of the inflatable article acting through the crimp flange 11 and the valve body 10. It is of the utmost importance that the opening of the cartridge through the pulling of the lanyard does not turn the valve body 10 with respect to its crimp flange 11, nor disturb the seal therebetween.

Valve body 10 has an upper or outer portion 29 in the form of a tube of uniform wall thickness, (except for the axially extending flat thereon), the outer end of such portion of the valve body being provided with an external thread 30 and an internal thread 31. Thread 31 receives the threaded portion of a conventional inflation valve core (not shown), the valve core element of which selectively sealingly cooperates with the frustoconical valve seat 40 which is formed in the passage in the valve body at the zone between the outer circular cylindrical passage 39 and the inner circular cylindrical passage 41 having a diameter somewhat smaller than that of passage 39. The portion 29 of the valve body 10 has a transverse hole 32 therethrough, such hole communicating with the chamber within portion 20 of the manifold 16 so that $CO_2$ under pressure can pass from the opened $CO_2$ cartridge into such chamber and thence through the hole 32, down through the valve and into the inflatable article.

The valve body 10 is mounted in the passage 18 in the sleeve portion 17 of the manifold 16, as above described. The valve body is held in the manifod and sealed thereto by having a sealing washer (not shown) disposed in an annular groove 34 on the valve body immediately above or outwardly, of an annular abutment or flange 35 on the valve body pulled tightly against one end of the sleeve 16 of the manifod by a cap nut 27 which is threadedly mounted upon the external threads 30 and the outer end of the valve body. An annular sealing washer (not shown) is mounted between the inner transverse surface of the cap nut 27 and the confronting end of the sleeve portion 16 of the manifold.

The inner end of the body 10 of the valve has an initial external shape and a cross-section which are best shown in FIG.5. Immediately axially beyond or upwardly from the flange 35, as the valve body is shown in FIG. 5, such end of the valve body has a circular cylindrical outer surface 43. Surface 43 merges with a surface 36 at an annular line 38, elements of surface 36 which lie in radial axial planes being convexly part-circular and decreasing in thickness in the direction away from flange 35 until it reaches substantially an annular edge 37. The passage 41 through such upper (FIG. 5) portion of the valve body is of circular cylindrical shape throughout its length. It is such end portion of the valve body which is deformed, after the assembly of the crimp flange 11 thereon, so as securely mechanically to connect the two parts together and to insure a seal therebetween under the most rigorous service conditions.

In its relaxed, unmounted condition, the crimp flange 11 has a central hole 42 therethrough which is slightly smaller in diameter than the outer diameter of the lower or inner portion 43 of the valve body beyond the flange 35 which is received therein. For example, the hole 42 may have a relaxed diameter which is 0.010 inches less than the outer diameter of the surface 43 of the valve body.

Referring particularly to FIG.5 wherein the crimp flange 11 is shown telescoped upon the valve body but is as yet uncrimped thereon, it will be seen that the crimp flange 11 has a flat extended annular surface 44 (at the bottom as shown in FIG.5), an upper radially outer annular surface 46 which is disposed at a small angle with respect to surface 44, a steep, upwardly converging frusto-conical surface 47, and an upper transverse annular surface 49. All of such surfaces are coaxial and are coaxial of the valve body 10 assembled in the crimp flange. Inwardly of the annular surface 49 the crimp flange 11 has a recess 50 which has a radially outer circular cylindrical side wall 51 and a bottom wall 54 which is a part of a torus of circular radial section, surface 54 being joined to surface 51 by a sharp annular "corner" or fillet 52 the elements of which in radial axial section enclose an angle of less than 90°. As shown in FIG. 1, the recess 50 is axially deep enough wholly to receive the crimped connection 15, the annular surface 49 protecting the other wall of the inflatable article from engagement with the crimped connection.

As will be seen in FIG. 5, when the parts are assembled as shown, the surface 54 of the crimp flange extends downwardly substantially to the annular line 38 on the valve body. There is intimate, sealing contact between the confronting and tightly engaging cylindrical surfaces 42, 43 of the crimp flange and the valve body because the relaxed diameter of surface 42 is less than that of surface 43.

The crimp joint 15 between the valve body 10 and the crimp flange 11 is formed, as shown in FIGS.5, 6, 7, by employing an apparatus including a crimping tool 55 which is specifically shown in FIGS.8 and 9. Such crimping apparatus separates the initially continuous or unseparated side wall of the inner end of the valve body into a plurality of identical prongs or "petals" (6 shown), and bends them radially outwardly and then reversely so that their lower ends, which are in the form of hooks or teeth, bite into the surface 54 of the crimp flange 11 at the recess 50 so as to have firm "keying" engagement therewith.

This relationship is shown in FIGS. 2 and 3, wherein the splits or clefts between successive prongs 56 in the lower or inner end of the valve body are designated 57, the hook-like ends or teeth on the prongs 56 are designated 59, and the depressions in the inner surface of the recess 50 in the crimp flange 11 formed by the ends 59 of the prongs are designated 60.

As shown in FIG. 8, the crimping tool 55 has a main, upper circular cylindrical body 61 which is adapted to be mounted on the lower end of a vertical press plunger for reciprocal movement in a vertical direction. The crimping tool 55 has an axially disposed pilot or mandrel part 62 projecting from the lower end thereof, part 62 being of equilateral, polygonal cross-section (six-sided in this instance). The side surfaces of portion 62 are designated 64, successive surfaces 64 meeting at edges 65 which are disposed in planes radial of the tool 55. The portion 62 is tapered, the surfaces 64 thereof and the edges 65 thereof converging downwardly (FIG.8) at an angle $\alpha$ with respect to the axis of the tool in axial planes disposed normal to surfaces 64. The lower end 66 of the portion 62 is uniformly and symmetrically rounded, as shown.

Extending radially outwardly of each of the surfaces 64 and in the lower end portion of the body 61 (FIG.8) above the respective surfaces 64 are part-spherical recesses or scallops 67 which are cut into the main transverse lower surface 68 of the portion 61 of the tool. Recesses 67 may be formed, for example, by an engraving tool of spherical configuration which is advanced toward the body 61 with its longitudinal axis disposed at the angle $\alpha$ centrally of and with respect to the respective side surface 64 of the pilot portion 62 of the tool. The boundary lines 69 between successive recesses 67 lie in the same radial axial plane as the lines 65 between successive surfaces 64.

The crimped joint 15 between the valve body 10 and the crimp flange 11 is formed as shown in FIGS.5, 6, and 7. The valve body 10 is mounted upon a suitable support (not shown), so as to sustain the major portion of the axial thrust imposed thereon, by the lower surface of the flange 35. Some of such thrust may, if desired, also be taken by engagement between a suitable abutment and the lower end of the valve body. The crimp flange 11 is then telescoped over the then upper end of the valve body so as to lie as shown in FIG.5. Thereupon the press plunger is lowered, driving the tool 55 downwardly so that the pilot portion 62 of the tool enters the upper end of the valve body. This position of the parts is shown in FIG.5, wherein the side surfaces 64 of the pilot portion have not yet engaged the valve body but the edges 65 between side surfaces 64 have just made contact with the valve body.

Further downward travel of the tool 55, as shown in FIG.6, causes the thinned and thus weakened end of the side wall of the valve body to be split in 6 equal intervals by the edges 65 between successive surfaces 64 thereof. The thus-formed rudimentary prongs, designated 56' in FIG.6, travel upwardly and radially outwardly with respect to and within the recesses 67 in the lower end of the tool body 61, the central radial geometrical elements of which lie parallel to the corresponding element of surface 54 of the crimp flange so that they are progressively deformed and in effect turned back on themselves. During such operation, the various parts 10, 11, and 55 remain centered with respect to each other, such action being aided by the fact that the portion 61 of the tool 55 has an outer diameter such that the lower end of such tool accurately fits within the vertical circular cylindrical sidewall 51 of the crimp flange 11.

When the tool 55 has reached its lower terminal position, as shown in FIG.7, the crimp 15 between the valve 10 and the crimp flange 11 is complete. As the crimped connection is shown in FIGS.2 and 7, the prongs 56 are thickened somewhat at their bight or zone of reverse bend, and are thereby strengthened by the upsetting action of the tool 55 thereupon. The radially outer hook-like ends of prongs 56, as well as the main parts of the prongs, lie in depressions which they form in the surface 54 of the crimp flange 11, and the axially inner surfaces of the prongs overlie and tightly, compressingly engage the surface 54 of the crimp flange. No further compaction or deformation of the prongs 56 is necessary, although, if desired, the tool 55 may be withdrawn from the assembly shown in FIG.7 and a second tool (not shown) having a flat, transverse lower end may be thrust downwardly within the recess 50, as, for example, at a second station of the crimping apparatus in order still further to bend the prongs 56 downwardly and to deepen the depressions 50 formed thereby and into which their outer ends 59 lockingly fit.

Because of the elasticity of the crimp flange 11, and the resilient deformation of the crimp flange 11 by the prongs 56, the connection between the valve body 10 and the crimp flange 11 remains tight despite their subjection to high torque forces which tend to turn them relative to each other. Because the central portion of crimp flange 11 is very substantially compressed between the prongs 56 and flange 35, the material of the crimp flange tends to "flow" radially inwardly into tighter sealing engagement with surface 43 of the valve body. A further seal between the crimp flange 11 and body 10 is formed between the upper (FIG.5) surface of flange 35 of the valve body and the central portion of the crimp flange, by reason of the axial compression of the crimp flange between the flange 35 and prongs 56.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. An assembly comprising a sleeve-like outer valve body and a mounting flange connected and sealed to the valve body, an end portion of the valve body extending through and beyond an opening in the mounting flange, an abutment on the valve body extending thereabout axially inwardly of and in contact with the mounting flange, the portion of the valve body extending beyond the mounting flange being split into a plurality of prongs, said prongs being spread and bent to overlie an axially outer face of the mounting flange and to thrust the mounting flange into forcible sealing engagement with the abutment thereby providing a connection strongly resisting turning of the valve body relative to the flange.

2. An assembly according to claim 1, wherein the mounting flange has a recess in the axially outer face thereof, said recess surrounding the opening in the mounting flange, the crimped connection between the valve body and mounting flange lying wholly within and being shielded by the walls of said recess.

3. An assembly according to claim 1, wherein the mounting flange is made of resilient plastic material and is locally deformed by the prongs as they thrust the mounting flange against the annular abutment.

4. An assembly according to claim 3, wherein the valve body has an interference fit with the opening in the mounting flange when the latter is in relaxed condition.

5. An assembly according to claim 3, wherein the prongs have re-entrant hook-like ends, said ends of the prongs being embedded in depressions formed thereby in the end surface of the mounting flange which they overlie.

6. An assembly according to claim 5, wherein the axially outer surface of the mounting flange has an axially outwardly convex part-toroidal surface coaxial of and closely surrounding the opening in the mounting flange, the opening and the outer surface of the valve body being circular cylindrical, and the prongs being bent radially outwardly and over said part-toroidal surface on the mounting flange.

7. An assembly according to claim 5, wherein the ends of the prongs are disposed radially outwardly of the valve body in a circle coaxial of and of a diameter which is not greatly less than that of the annular abutment on the valve body.

8. An assembly according to claim 3, wherein the ends of the prongs are disposed radially outwardly of valve body in a circle coaxial of and of a diameter which is not greatly less than that of the annular abutment on the valve body.

9. An assembly according to claim 1, wherein said prongs decrease in wall thickness from an innermost portion to an outermost portion.

* * * * *